March 21, 1950     E. EYMERIC     2,500,981
ROTARY DRUM AND PERFORATE CYLINDER
FOR REMOVING FRUIT PITS
Filed Sept. 25, 1946
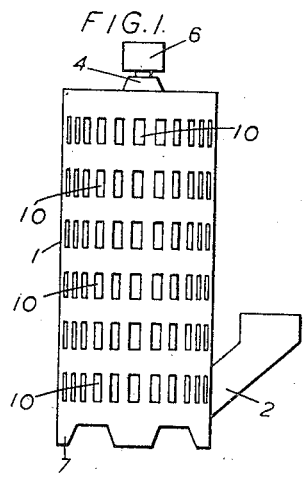
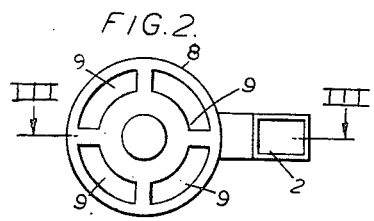
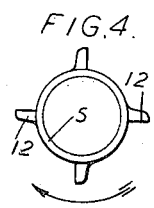
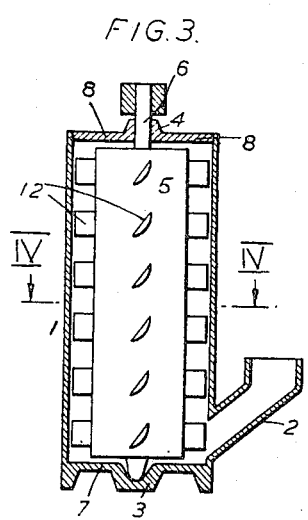
Inventor
Emile Eymeric
By
S. Sokal.
Attorney Patented Mar. 21, 1950

2,500,981

UNITED STATES PATENT OFFICE 2,500,981

ROTARY DRUM AND PERFORATE CYLINDER
FOR REMOVING FRUIT PITS

Emile Eymeric, Tunis, Tunisia

Application September 25, 1946, Serial No. 699,210
In Tunis October 10, 1939

Section 1, Public Law 690, August 8, 1946
Patent expires October 10, 1959

4 Claims. (Cl. 146—17)

The invention relates to rotary separators and has for its object to provide a separator which can be used for treating solid, semi-solid, pasty, pulverulent and liquid substances and mixtures thereof, containing two or more components of a different consistency or character.

The separation may include sorting, disintegrating, pulverizing, grinding, crushing, shelling, stripping and stoning operations, according to the nature of the material treated. The apparatus of the invention is particularly intended for treating fruit containing seed, stone-fruit, fruit having a hard rind, substances or articles having a hard core and cirrous or gummy matter adhering thereto.

The improved separator comprises an outer perforated cylindrical casing and an inner rotatable drum provided upon its outside with blades or vanes. The material to be treated, is introduced into the annular space between the drum and the casing, and is acted upon by the blades or vanes of the drum the speed of rotation of the drum being such that the material to be treated is disintegrated and separated by the combined effects of impact pressure and centrifugal force, the centrifugally lighter particles being discharged radially and the centrifugally heavier particles axially through openings in the end of the casing.

In the accompanying drawings which show by way of example a vertical separator embodying the features of the invention, Fig. 1 is an elevation of the separator, Fig. 2 a top view of the casing, Fig. 3 a longitudinal axial section through the casing on line III—III in Fig. 2, showing the drum in view, and Fig. 4 a cross-section through the drum on line IV—IV in Fig. 3.

In the drawings, 1 indicates a cylindrical casing which is provided with a charging socket 2 at one end and bearings 3 and 4 for a rotary drum 5 driven by means of a pulley 6. The casing has a base 7 and a top or lid 8 which latter is provided with several (four) openings 9 for the discharge of the centrifugally heavier particles of the material to be treated. Upon its periphery the casing 1 has a large number of openings 10 arranged in horizontal and vertical rows, as shown for the discharge of the centrifugally lighter particles of the material to be treated. Within the casing 1 is rotatably mounted a cylindrical hollow drum 5 which is provided with inclined blades 12. In the construction shown there are four blades in a horizontal row, and the number of horizontal rows of blades 12 is the same as that of horizontal rows of openings 10 in the casing, the blades 12 and openings 10 being in the same horizontal planes.

The operation is as follows:

The material to be treated is, in the construction shown, introduced through the charging socket 2 into the casing and is disintegrated and separated by the combined effects of impact pressure and centrifugal force by the rapidly rotating blades 12, the material being thrown by the action of centrifugal force against the casing and also moved upwards towards the top end of the casing, this movement being produced by the inclination of the blades. The centrifugally lighter part of the material which is thrown against the casing is discharged through the openings 10, the other centrifugally heavier part being discharged at the top through openings 9. The disintegration and/or separation into these two parts proceeds gradually. For instance, if the material is separated into solid and pulverulent parts the solid part issues at the top and the pulverulent part issues radially through openings 10. In the case of a material consisting of hard and soft parts, the soft part issues radially and the hard part at the top.

It will be understood that the shape, dimensions and the number of the blades or vanes 12 and their disposition relatively to the openings 10, as well as the size and the speed of the rotary drum 5 may greatly vary in accordance with the material to be treated. The shape the dimensions and the relative disposition of the openings 10 may likewise vary.

For treating hard or compact materials, the inner surface of the casing 1 may be provided with protuberances or with cutting projections.

Various other changes may be made without departing from the scope of the invention, as defined in the appended claims.

I claim:

1. An apparatus for decorticating and stoning fruit and the like comprising in combination: a vertical cylindrical casing, a rotary cylindrical drum coaxially arranged within said casing, a narrow annular separating zone of substantially uniform cross-section defined between said drum and said casing, an inlet for material to be treated at the lower end of said separating zone, a plurality of rows of holes in different horizontal planes in said casing, the holes in each row being equi-spaced around the entire periphery of said casing and adjacent rows of holes being spaced apart by an imperforate portion of the casing of a width substantially equal to the width of the holes, a plurality of horizontal rows of discrete, radially extending blades around the periphery of said drum, the number of rows of blades being equal to the number of said rows of holes and each row of blades being substantially opposite a row of holes, each of said blades extending substantially across the cross-section of said separating zone and being so shaped and inclined with respect to the axis of rotation of said drum as continuously to move the material to be treated upwardly and axially through said zone and simultaneously to project said material by centrifugal force against said imperforate portions and through said openings, at least one axial outlet at the upper end of said zone, and means for rotating said drum at high speed to disintegrate and separate said material by the combined effects of projection and centrifugal force.

2. Apparatus as claimed in claim 1, wherein said holes in the casing are rectangular in shape.

3. Apparatus as claimed in claim 1, wherein each of said rows of blades comprise four equispaced substantially rectangular blades, each set at an angle to the vertical axis of said drum and having an overall horizontal width, measured in the direction of the periphery of said drum, slightly greater than the horizontal width of one of said holes in the casing.

4. Apparatus as claimed in claim 1, wherein the linear speed of rotation of said drum is at least 1000 metres per minute.

EMILE EYMERIC.

REFERENCES CITED

The following references are of record in the file of this patent:

UNITED STATES PATENTS

| Number | Name | Date |
|---|---|---|
| 306,544 | Sottiaux | Oct. 14, 1884 |
| 358,241 | Worth | Feb. 22, 1887 |
| 387,539 | Raymond | Aug. 7, 1888 |
| 551,495 | Landis | Dec. 17, 1895 |
| 1,039,721 | Fuller | Oct. 1, 1912 |
| 1,540,908 | Shelton | June 9, 1925 |
| 1,581,245 | Suzuki | Apr. 20, 1926 |
| 2,325,426 | Rietz | July 27, 1943 |
| 2,344,611 | Harris | Mar. 21, 1944 |